United States Patent
Zheng et al.

(10) Patent No.: US 8,025,476 B2
(45) Date of Patent: Sep. 27, 2011

(54) SYSTEM AND METHODS FOR CONTROLLING A WIND TURBINE

(75) Inventors: Danian Zheng, Simpsonville, SC (US); Xiongzhe Huang, Shanghai (CN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/570,988

(22) Filed: Sep. 30, 2009

(65) Prior Publication Data
US 2010/0135789 A1    Jun. 3, 2010

(51) Int. Cl.
*F03D 7/04* (2006.01)
(52) U.S. Cl. .......................................................... 415/1
(58) Field of Classification Search ............... 415/2.1, 415/4.1, 4.3, 4.5, 47, 48, 905, 908; 416/41; 73/170.01, 170.11
See application file for complete search history.

(56) References Cited

U.S. PATENT DOCUMENTS

| | | | |
|---|---|---|---|
| 6,320,272 B1 * | 11/2001 | Lading et al. | 290/44 |
| 6,946,751 B2 * | 9/2005 | Yoshida et al. | 290/44 |
| 7,281,891 B2 | 10/2007 | Smith et al. | |
| 7,309,930 B2 * | 12/2007 | Suryanarayanan et al. | 290/55 |
| 7,342,323 B2 * | 3/2008 | Avagliano et al. | 290/55 |
| 2006/0140764 A1 | 6/2006 | Smith et al. | |
| 2007/0075546 A1 | 4/2007 | Avagliano et al. | |
| 2007/0171396 A1 | 7/2007 | Harris et al. | |
| 2009/0047116 A1 | 2/2009 | Barbu et al. | |

* cited by examiner

*Primary Examiner* — Edward Look
*Assistant Examiner* — Ryan Ellis
(74) *Attorney, Agent, or Firm* — Armstrong Teasdale LLP (57) ABSTRACT

A method for controlling operation of a wind turbine is described. The wind turbine includes a rotor having a plurality of rotor blades and an upwind wind condition measurement device. The method includes measuring a wind condition upwind from the rotor using the upwind wind condition measurement device and providing the measured wind condition to a processor. The method also includes determining a control algorithm parameter, based at least partially on the measured wind condition, that controls at least one of a wind turbine response bandwidth, a wind turbine response speed, and a wind turbine control error range. The method also includes determining a wind turbine operating command based at least partially on the control algorithm parameter and applying the wind turbine operating command to operation of the wind turbine.

20 Claims, 7 Drawing Sheets

SYSTEM AND METHODS FOR CONTROLLING A WIND TURBINE

BACKGROUND OF THE INVENTION

The subject matter described herein relates generally to controlling operation of a wind turbine, and more specifically, to controlling operation of a wind turbine based at least partially on upwind measurements from an upwind measurement device.

Wind turbine generators utilize wind energy to produce electrical power. Wind turbine generators typically include a rotor having multiple blades that transform wind energy into rotational motion of a drive shaft, which in turn is utilized to drive an electrical generator to produce electrical power. Each of the multiple blades may be pitched to increase or decrease the rotational speed of the rotor. Pitching a blade refers to rotating the blade to change the angle of attack of the wind on the blade. Pitching toward feather, or feathering the pitch, refers to rotating the blade such that the blade surface is aligned along a direction of the wind speed (i.e., reducing the angle of attack). Pitching a blade toward feather decreases wind energy capture by the blade. Typically, blades are progressively pitched toward feather to counteract increasing wind speed in order to maintain a substantially constant generator speed.

Changes in atmospheric conditions, for example, wind speed, wind turbulence intensity, and wind direction, may significantly influence power produced by wind turbine generators. A power output of a wind turbine generator increases with wind speed until the wind speed reaches a rated wind speed for the turbine. At and above the rated wind speed, the wind turbine generator operates at a rated power. The rated power is an output power at which a wind turbine generator can operate with a level of fatigue to turbine components that is predetermined to be acceptable. At wind speeds higher than a certain speed, or at a wind turbulence level that exceeds a predetermined magnitude, typically referred to as a "trip limit" or "monitor set point limit," wind turbines may be shut down, or the loads may be reduced by regulating the pitch of the blades or braking the rotor, in order to protect wind turbine components against damage. A static rated power and static trip limits are typically determined during a design stage of the wind turbine and therefore are not dependent upon changing wind conditions that may be present during operation of the wind turbine. A high wind turbulence intensity corresponds to frequently changing wind conditions, which may include frequent and/or strong wind gusts. Wind gusts are sudden, brief increases in the speed of the wind.

Sensors positioned on the wind turbine react to wind conditions as they affect the wind turbine. For example, a wind speed sensor positioned on the wind turbine will measure a wind gust at substantially the same time as the wind gust strikes the rotor blades. Wind turbine operation adjustments are subject to a time lag between measurement of the wind gust and the actual pitching of the blades, and therefore, wind turbine operation adjustments typically are performed at a time after the wind gust has affected wind turbine operation. As a result, the wind gust may cause the rotor speed and/or the output power to exceed a trip limit, before a wind turbine operation adjustment is completed, causing a wind turbine shut down.

Measurements of wind conditions upwind from the wind turbine may be used by a system controller of the wind turbine to determine wind turbine operating commands. A change in wind speed may be measured upwind from the wind turbine, and the pitch of the blades adjusted to compensate for the change in wind speed once the wind reaches the wind turbine. However, wind turbine performance may be reduced in times of high wind turbulence due to oscillations in blade pitch caused by rapid component adjustments. Additionally, a balance between a torque on the rotor created by interaction of the rotor blades and the wind and a generator torque facilitates stable operation of the wind turbine. Blade pitch adjustments may cause an imbalance between the torque on the rotor caused by the wind and the generator torque.

BRIEF DESCRIPTION OF THE INVENTION

In one aspect, a method for controlling operation of a wind turbine is provided. The wind turbine includes a rotor having a plurality of rotor blades and an upwind wind condition measurement device. The method includes measuring a wind condition upwind from the rotor using the upwind wind condition measurement device and providing the measured wind condition to a processor. The method also includes determining a control algorithm parameter, based at least partially on the measured wind condition, that controls at least one of a wind turbine response bandwidth, a wind turbine response speed, and a wind turbine control error range. The method also includes determining a wind turbine operating command based at least partially on the control algorithm parameter and applying the wind turbine operating command to operation of the wind turbine.

In another aspect, a method for facilitating operation of a wind turbine is provided. The wind turbine includes a system controller and an upwind wind condition measurement device. The method includes configuring the upwind wind condition measurement device to provide the system controller with at least one upwind wind condition measurement. The method also includes configuring the system controller to receive the at least one upwind wind condition measurement and to determine a control algorithm parameter, based at least partially on the upwind wind condition measurement, that controls at least one of a wind turbine response bandwidth, a wind turbine response speed, and a wind turbine control error range. The method also includes configuring the system controller to determine a wind turbine operating command based at least partially on the control algorithm parameter and to apply the wind turbine operating command to operation of the wind turbine.

In yet another aspect, a wind turbine control system for a wind turbine is provided. The wind turbine control system includes an upwind wind condition measurement device positioned on or in close proximity to a body of the wind turbine. The upwind wind condition measurement device is configured to measure at least one upwind wind condition. The wind turbine control system also includes a processor coupled to the upwind wind condition measurement device. The processor is configured to receive the upwind wind condition measurement. The processor is also configured to determine a control algorithm parameter, based at least partially on the upwind wind condition measurement, that controls at least one of a wind turbine response bandwidth, a wind turbine response speed, and a wind turbine control error range. The processor is also configured to determine a wind turbine operating command based at least partially on the control algorithm parameter and to apply the wind turbine operating command to operation of the wind turbine.

DETAILED DESCRIPTION OF THE INVENTION

As used herein, the term "blade" is intended to be representative of any device that provides reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power. As used herein, the term "windmill" is intended to be representative of any wind turbine that uses rotational energy generated from wind energy, and more specifically mechanical energy converted from kinetic energy of wind, for a predetermined purpose other than generating electrical power, such as, but not limited to, pumping a fluid and/or grinding a substance.

Technical effects of the methods, systems, and computer-readable media described herein include at least one of: (a) measuring a wind condition upwind from a rotor using an upwind condition measurement device; (b) providing the measured wind condition to a processor; (c) determining a control algorithm parameter, based at least partially on the measured wind condition, that controls at least one of a wind turbine response bandwidth, a wind turbine response speed, and a wind turbine component operating error range; (d) determining a wind turbine operating command based at least partially on the control algorithm parameter; and (e) applying the wind turbine operating command to operation of the wind turbine.

Figure 1:
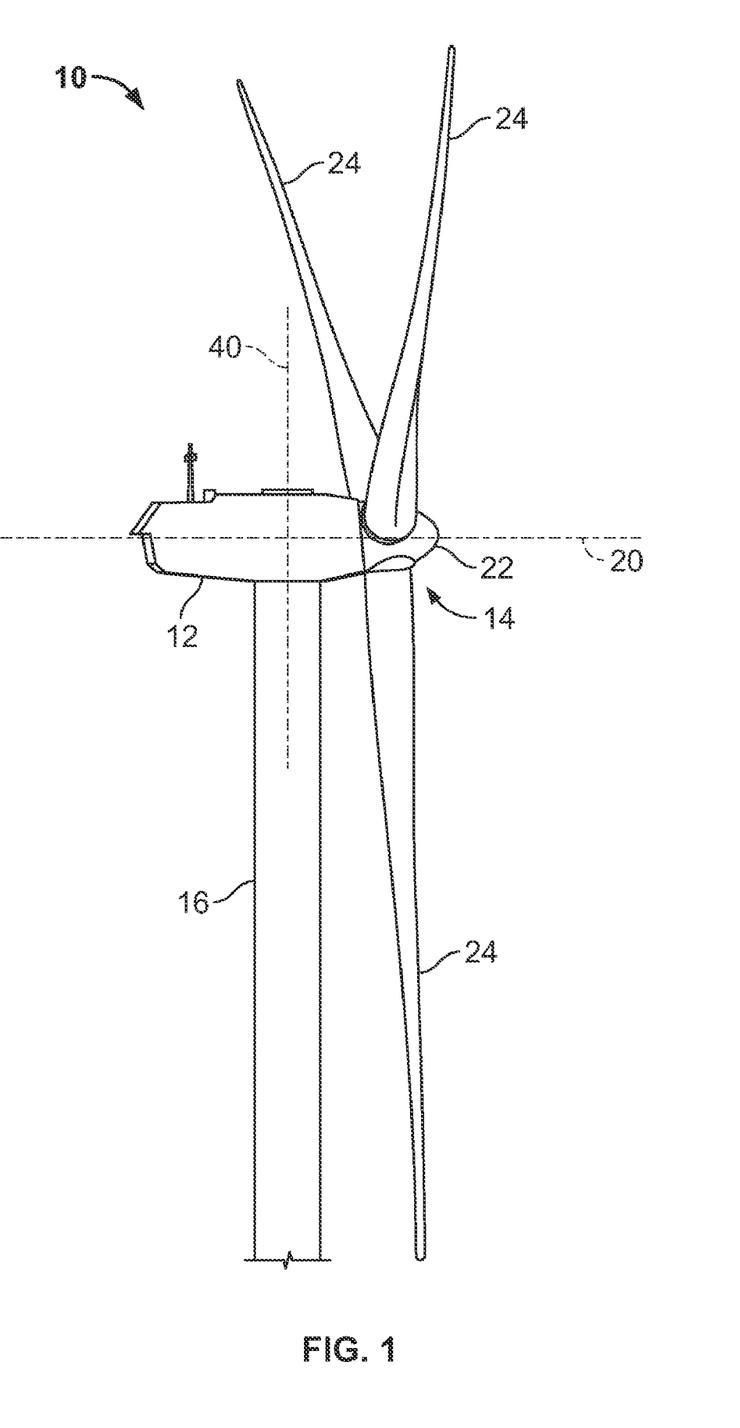
FIG. 1 is a perspective view of an exemplary wind turbine.
Figure 2:
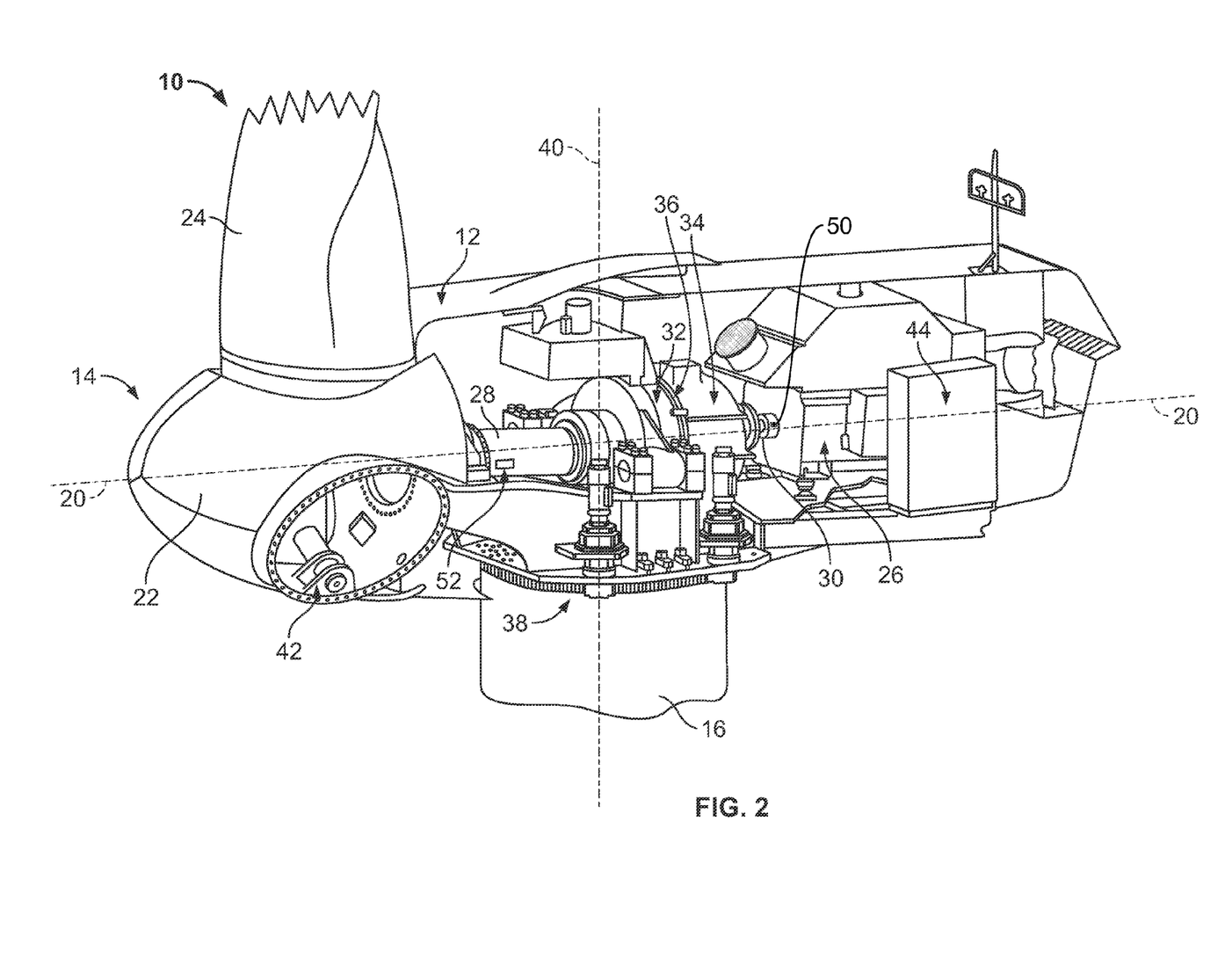
FIG. 2 is a partial cut-away perspective view of a portion of the wind turbine shown in FIG. 1.

FIG. 1 is a perspective view of an exemplary wind turbine 10. FIG. 2 is a partially cut-away perspective view of a portion of wind turbine 10. Wind turbine 10 described and illustrated herein is a wind generator for generating electrical power from wind energy. However, in some embodiments, wind turbine 10 may be, in addition or alternative to a wind generator, any type of wind turbine, such as, but not limited to, a windmill (not shown). Moreover, wind turbine 10 described and illustrated herein includes a horizontal-axis configuration. However, in some embodiments, wind turbine 10 may include, in addition or alternative to the horizontal-axis configuration, a vertical-axis configuration (not shown). Wind turbine 10 may be coupled to an electrical load (not shown), such as, but not limited to, a power grid (not shown), for receiving electrical power therefrom to drive operation of wind turbine 10 and/or its associated components and/or for supplying electrical power generated by wind turbine 10 thereto. Although only one wind turbine 10 is shown in FIG. 1, in some embodiments, a plurality of wind turbines 10 may be grouped together, sometimes referred to as a "wind farm."

Wind turbine 10 includes a body or nacelle 12 and a rotor (generally designated by 14) coupled to body 12 for rotation with respect to body 12 about an axis of rotation 20. In the exemplary embodiment, body 12 is mounted on a tower 16. However, in some embodiments, in addition or alternative to tower-mounted body 12, wind turbine 10 includes a body 12 adjacent the ground and/or a surface of water. Tower 16 may have any suitable height enabling wind turbine 10 to function as described herein. Rotor 14 includes a hub 22 and a plurality of blades 24 (sometimes referred to as "airfoils") extending outwardly from hub 22 for converting wind energy into rotational energy. Although rotor 14 is described and illustrated herein as having three blades 24, rotor 14 may have any suitable number of blades 24. Blades 24 may have any suitable length that allows wind turbine 10 to function as described herein. For example, in some embodiments, one or more rotor blades 24 are about one-half meter long, while in some embodiments one or more rotor blades 24 are about fifty meters long. Other examples of blade 24 lengths include ten meters or less, about twenty meters, about thirty-seven meters, and about forty meters. Still other examples include rotor blades larger than about fifty meters long.

Despite how blades 24 are illustrated in FIG. 1, rotor 14 may have blades 24 of any shape, and may have blades 24 of any type and/or any configuration, whether such shape, type, and/or configuration is described and/or illustrated herein. One example of another type, shape, and/or configuration of rotor blades 24 is a ducted rotor (not shown) having a turbine (not shown) contained within a duct (not shown). Another example of another type, shape, and/or configuration of blades 24 is a Darrieus wind turbine, sometimes referred to as an "eggbeater" turbine. Yet another example of another type, shape, and/or configuration of blades 24 is a Savonious wind turbine. Even another example of another type, shape, and/or configuration of blades 24 is a traditional windmill for pumping water, such as, but not limited to, four-bladed rotors having wooden shutters and/or fabric sails. Moreover, wind turbine 10 may, in some embodiments, be a wind turbine wherein rotor 14 generally faces upwind to harness wind energy, and/or may be a wind turbine wherein rotor 14 generally faces downwind to harness energy. Of course, in any of the embodiments, rotor 14 may not face exactly upwind and/or downwind, but may face generally at any angle (which may be variable) with respect to a direction of the wind to harness energy therefrom.

Referring now to FIG. 2, wind turbine 10 includes an electrical generator 26 coupled to rotor 14 for generating electrical power from the rotational energy generated by rotor 14. Generator 26 may be any suitable type of electrical generator, such as, but not limited to, a wound rotor induction generator. Generator 26 includes a stator (not shown) and a rotor (not shown). Rotor 14 includes a rotor shaft 28 coupled to rotor hub 22 for rotation therewith. Generator 26 is coupled to rotor shaft 28 such that rotation of rotor shaft 28 drives rotation of the generator rotor, and therefore operation of generator 26. In the exemplary embodiment, a generator shaft 30 is coupled to the generator rotor and coupled to rotor shaft 28 such that rotation of rotor shaft 28 drives rotation of the generator rotor. In other embodiments, the generator rotor is directly coupled to rotor shaft 28, sometimes referred to as a "direct-drive wind turbine." In the exemplary embodiment, generator shaft 30 is coupled to rotor shaft 28 through a gearbox 32, although in other embodiments generator shaft 30 is coupled directly to rotor shaft 28.

The torque of rotor 14 drives the generator rotor to thereby generate variable frequency alternating current (AC) electrical power from rotation of rotor 14. Generator 26 has an air gap torque between the generator rotor and stator that opposes the torque of rotor 14. A frequency converter 34 is coupled to generator 26 for converting the variable frequency AC to a fixed frequency AC for delivery to an electrical load (not shown), such as, but not limited to a power grid (not shown), coupled to generator 26. Frequency converter 34 also controls the air gap torque which facilitates controlling the power output of generator 26. Frequency converter 34 may be located anywhere within or remote to wind turbine 10. For example, frequency converter 34 may be located within a base (not shown) of tower 16.

In some embodiments, wind turbine 10 may include a rotor speed limiter, for example, but not limited to a disk brake 36. Disk brake 36 brakes rotation of rotor 14 to, for example, slow rotation of rotor 14, brake rotor 14 against full wind torque, and/or reduce the generation of electrical power from electrical generator 26. Furthermore, in some embodiments, wind turbine 10 may include a yaw system 38 for rotating body 12 about an axis of rotation 40 for changing a yaw of rotor 14, and more specifically for changing a direction faced by rotor 14 to, for example, adjust an angle between the direction faced by rotor 14 and a direction of wind.

In an exemplary embodiment, wind turbine 10 includes a variable blade pitch system 42 for controlling, including but not limited to changing, a pitch angle of rotor blades 24 with respect to a wind direction. Pitch system 42 may be coupled to a system controller 44 for control thereby. Pitch system 42 is coupled to hub 22 and blades 24, and includes pitch actuators for changing the pitch angle of blades 24 by rotating blades 24 with respect to hub 22. The pitch actuators may include any suitable structure, configuration, arrangement, means, and/or components, whether described and/or illustrated herein, such as, but not limited to, electrical motors, hydraulic cylinders, springs, and/or servomechanisms. Moreover, the pitch actuators may be driven by any suitable means, whether described and/or illustrated herein, such as, but not limited to, hydraulic fluid, electrical power, electro-chemical power, and/or mechanical power, such as, but not limited to, spring force.

Figure 3:
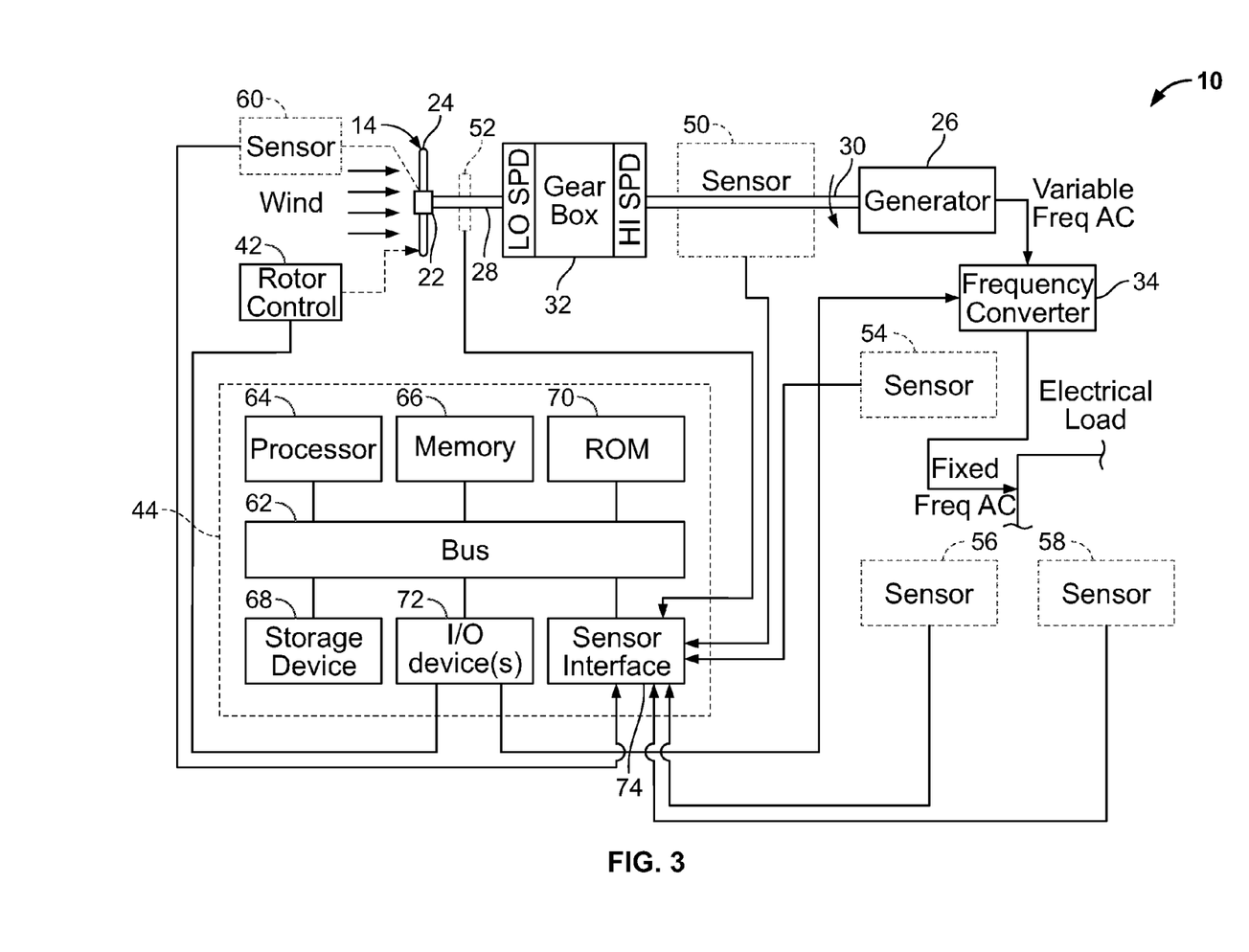
FIG. 3 is a schematic diagram of an exemplary wind turbine.

FIG. 3 is a block diagram of an exemplary embodiment of wind turbine 10. In the exemplary embodiment, wind turbine 10 includes one or more system controllers 44 coupled to some or all of the components of wind turbine 10 for generally controlling operation of wind turbine 10 and/or controlling operation of some or all of the components thereof, regardless of whether such components are described and/or illustrated herein. For example, in the exemplary embodiment, system controller 44 is coupled to variable blade pitch system 42 for controlling the pitch of blades 24. Furthermore, system controller 44 is coupled to, and configured to control, frequency converter 34. In the exemplary embodiment, system controller 44 is mounted within body 12 (shown in FIG. 2). However, additionally or alternatively, one or more system controllers 44 may be remote from body 12 and/or other components of wind turbine 10. System controller 44 may be used for, but is not limited to, overall system monitoring and control including, for example, pitch and speed regulation, high-speed shaft and yaw brake application, yaw and pump motor application, and/or fault monitoring. Alternative distributed or centralized control architectures may be used in some embodiments.

In an exemplary embodiment, wind turbine 10 includes a plurality of sensors, for example, sensors 50, 52, 54, 56, and 58. Sensors 50, 52, 54, 56, and 58 measure a variety of parameters, including, but not limited to, operating conditions and atmospheric conditions. Each of sensors 50, 52, 54, 56, and 58 may be an individual sensor or a plurality of sensors. Sensors 50, 52, 54, 56, and 58 may be any suitable sensor having any suitable location within or remote to wind turbine 10 that allows wind turbine 10 to function as described herein. In some embodiments, sensors 50, 52, 54, 58, and 58 are coupled to system controller 44 for transmitting measurements to system controller 44 for processing thereof.

In the exemplary embodiment, wind turbine 10 also includes an upwind wind condition measurement device 60. In the exemplary embodiment, upwind wind condition measurement device 60 is configured to measure at least one wind condition upwind from wind turbine 10 and provide the measurement to system controller 44. System controller 44 is configured to control a rotor speed and an electrical power output of generator 26 based at least partially on the upwind wind condition measurement. Rotor speed and power output of electrical generator 26 may be controlled by controlling the pitch of blades 24 using variable blade pitch system 42. Controlling air gap torque of generator 26 through use of frequency converter 34 may also simultaneously control power output of generator 26 and an overall mechanical load to generator 26.

In some embodiments, system controller 44 includes a bus 62 or other communications device to communicate information. In at least one specific example, system controller 44 includes a proportional-integral-derivative (PID) controller. One or more processor(s) 64 may be coupled to bus 62 to process information, including information from sensors 50, 52, 54, 56, 58 and/or other sensor(s), as well as information from upwind wind condition measurement device 60. System controller 44 may also include one or more random access memories (RAM) 66 and/or other storage device(s) 68. RAM (s) 66 and storage device(s) 68 are coupled to bus 62 to store and transfer information and instructions to be executed by processor(s) 64. RAM(s) 66 (and/or also storage device(s) 68, if included) can also be used to store temporary variables or other intermediate information during execution of instructions by processor(s) 64. System controller 44 may also include one or more read only memories (ROM) 70 and/or other static storage devices coupled to bus 62 to store and provide static (i.e., non-changing) information and instructions to processor(s) 64.

Processor 64 may include any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

System controller 44 may also include, or may be coupled to, input/output device(s) 72. Input/output device(s) 72 may include any device known in the art to provide input data to system controller 44 and/or to provide outputs, such as, but not limited to, yaw control, pitch control, and/or generator torque outputs. Instructions may be provided to memory 66 from storage device 68, such as, but not limited to, a magnetic disk, a read-only memory (ROM) integrated circuit, CD-ROM, and/or DVD, via a remote connection that is either wired or wireless providing access to one or more electronically-accessible media, etc. In some embodiments, hard-wired circuitry can be used in place of or in combination with software instructions. Thus, execution of sequences of instructions is not limited to any specific combination of hardware circuitry and software instructions, whether described and/or illustrated herein. System controller 44 may also include a sensor interface 74 that allows system controller 44 to communicate with sensors 50, 52, 54, 56, 58 and/or other sensor(s), as well as to communicate with upwind wind condition measurement device 60. Sensor interface 74 may include one or more analog-to-digital converters that convert analog signals into digital signals that can be used by processor(s) 64.

Figure 4:
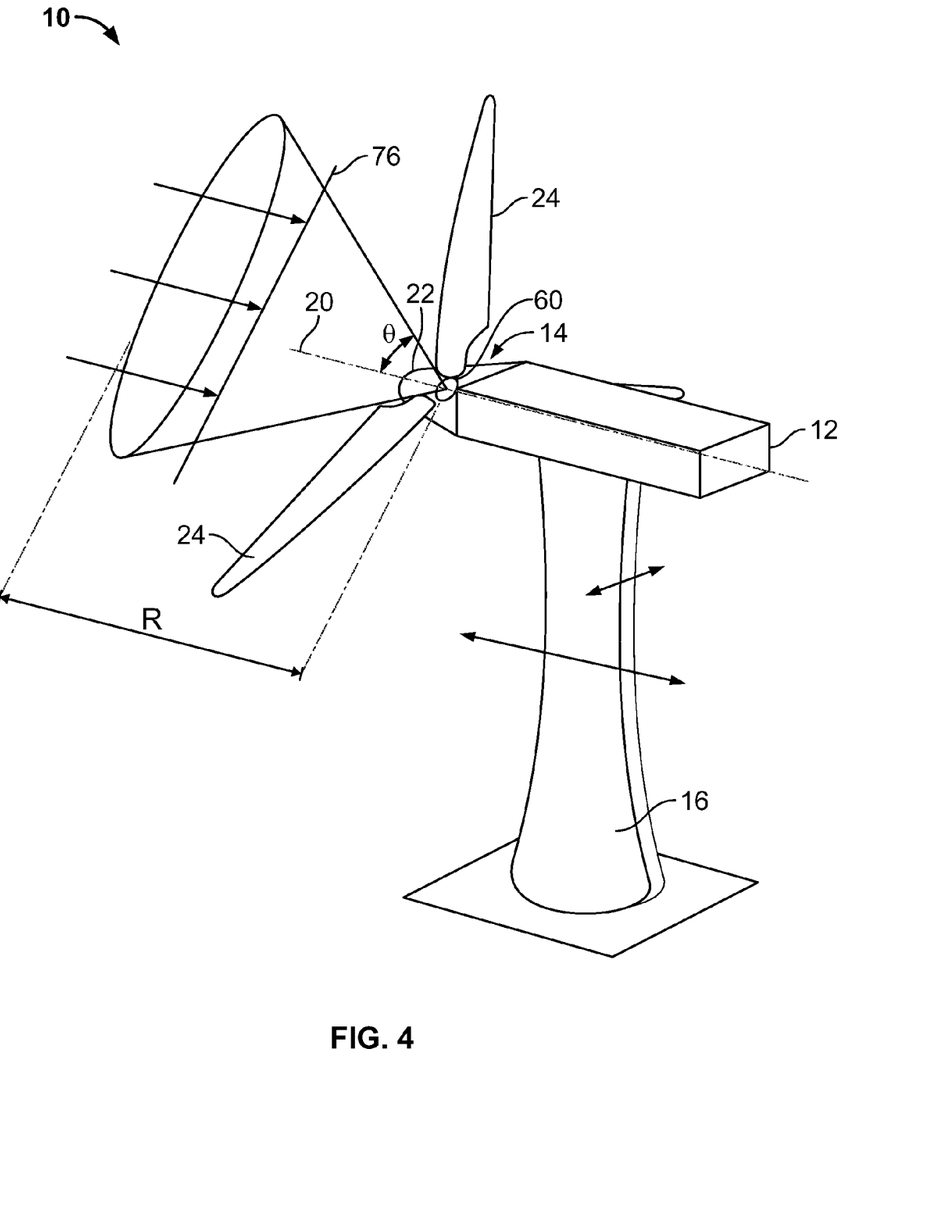
FIG. 4 is another perspective view of the wind turbine shown in FIG. 1.

FIG. 4 is another perspective view of wind turbine 10 (shown in FIG. 1), further illustrating upwind wind condition measurement device 60 (shown in FIG. 3). As described above, in cases of sudden wind gusts, wind speed may increase in a relatively small interval of time. In the exemplary embodiment, wind turbine components are preemptively adjusted before a gust hits rotor 14 (shown in FIG. 1) in order to compensate for a time lag between measurement of the wind gust and a response by wind turbine components. For example, in order to compensate for the time lag between measurement of the wind gust and response of variable blade pitch system 42, blades 24 are preemptively pitched before the gust hits rotor 14. In a specific example, variable blade pitch system 42 can change the blade pitch to fully feathered in ten seconds. At a given wind speed, if upwind wind condition measurement device 60 measures a wind gust a distance of three hundred meters upwind from rotor 14, the blades can be fully feathered by the time the wind gust reaches rotor 14.

Preemptively pitching blades 24 prior to interaction with the wind gust facilitates preventing the wind gust from applying a high load to rotor 14. Furthermore, in the exemplary embodiment, operation of frequency converter 34 is preemptively adjusted to balance the torque applied to rotor 14 by the wind and the torque on generator 26. For example, both the pitch of blades 24 and the torque on generator 26 are adjusted upon measurement of a changed wind condition measured a distance upwind from rotor 14.

Adjusting the blade pitch in anticipation of the wind gust facilitates running wind turbine 10 through the wind gust. Adjusting the blade pitch also facilitates maintaining a substantially constant rotor speed and power output from wind turbine 10 during such sudden gusts, or at least a relatively smooth or controlled transient in rotor speed and power output. Measuring the wind condition in advance of the wind condition interacting with rotor 14, and shedding the incoming load in advance by controlling the blade pitch and generator torque, facilitates preventing generator 26 (shown in FIG. 3) from reaching a trip limit upon the gust reaching rotor 14. More specifically, shedding the incoming load in advance facilitates preventing, for example, but not limited to, reaching an overspeed trip limit, a power trip limit, and/or a turbine oscillation magnitude/load limit upon the gust reaching rotor 14. The methods and system described herein facilitate operating wind turbine 10 through the wind gust, rather than having to shut down wind turbine 10.

To implement this preemptive pitching, at least one wind condition is sensed upwind of blades 24 by upwind wind condition measurement device 60. The at least one wind condition may include a wind speed, a wind direction, and/or a wind turbulence intensity. Although described herein as measuring wind turbulence intensity, upwind wind condition measurement device 60 and/or system controller 44 may be configured to determine the wind turbine intensity by measuring wind speed and calculating a variance in wind speed around an average measured wind speed. In the exemplary embodiment, upwind wind condition measurement device 60 is a light detection and ranging device, also referred to as LIDAR. However, upwind wind condition measurement device 60 may also include any suitable measurement device that allows system controller 44 to function as described herein.

LIDAR 60 is a measurement device configured to scan an annular region around wind turbine 10 and measure upwind wind conditions based upon reflection and/or back-scattering of light transmitted by LIDAR 60 from aerosol. The cone angle ($\theta$) and the range (R) of LIDAR 60 may be suitably selected to provide a desired accuracy of measurement as well as an acceptable sensitivity. In the illustrated embodiment, LIDAR 60 is located on hub 22 whereupon blades 24 are mounted. In certain alternate embodiments, LIDAR 60 may also be located around the base of the wind turbine tower 16.

In the exemplary embodiment, LIDAR 60 is configured to measure an upwind wind condition ahead of at least one specific portion, typically the most significant sections of blades 24 in terms of contributions of those sections to aerodynamic torque on the blades. These sections may include, for example, sections close to the tips of blades 24. The points ahead of blades 24 at which wind conditions are measured by LIDAR 60 are represented by a plane 76.

Figure 5:
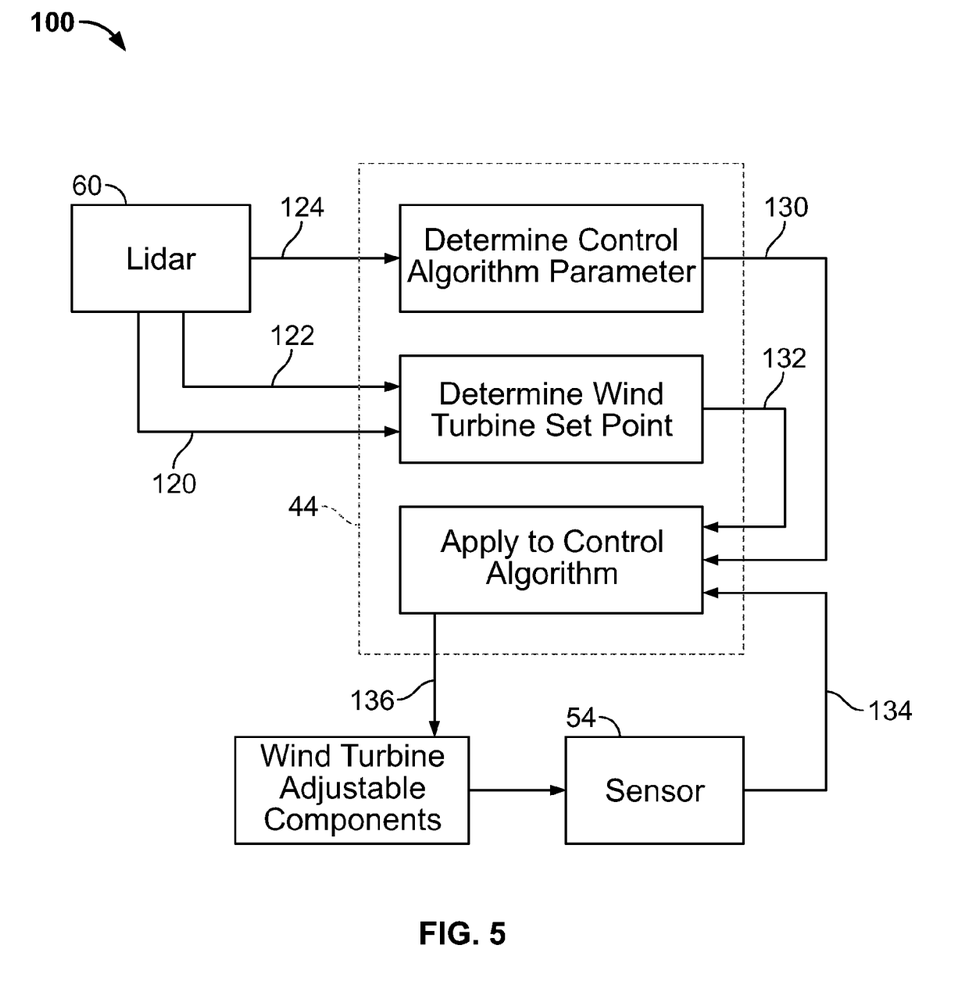
FIG. 5 is a control diagram that illustrates a flow of exemplary control signals during operation of a wind turbine.

FIG. 5 is a control diagram 100 that illustrates a flow of exemplary control signals during operation of a wind turbine, for example, operation of wind turbine 10 (shown in FIGS. 1-4). As described above, wind turbine 10 includes a rotor having a plurality of rotor blades, for example, rotor 14 having rotor blades 24 (shown in FIG. 1), and an upwind wind condition measurement device, for example, upwind wind condition measurement device 60 (shown in FIGS. 3-4). As described above, in the exemplary embodiment, upwind wind condition measurement device 60 is a LIDAR device configured to generate and output a LIDAR signal that corresponds to at least one of a measured upwind wind speed 120, a measured upwind wind direction 122, and a measured upwind wind turbulence intensity 124.

In the exemplary embodiment, upwind wind speed 120, upwind wind direction 122, and upwind wind turbulence intensity 124 are received at a system controller, for example, system controller 44 (shown in FIG. 3). System controller 44 determines a control algorithm parameter 130 based at least partially on the measured upwind wind turbulence intensity 124. System controller 44 may also determine a wind turbine set point 132, for example, a power set point and/or a rotor speed set point, based at least partially on upwind wind speed 120 and upwind wind direction 122. Sensors, for example, sensor 54 (shown in FIG. 3) measure actual positions and/or settings of wind turbine components and actual performance of the wind turbine components, and output sensor readings 134. Control algorithm parameter 130, wind turbine set point 132, and sensor readings 134 are entered into a control algorithm. System controller 44 is also configured to generate at least one of a wind turbine operating command 136 based on an output of the control algorithm and apply the wind turbine operating command 136 to adjustable components and/or systems of wind turbine 10, for example, variable blade pitch system 42 and frequency converter 34. The wind turbine operating command 136 may facilitate setting a blade pitch control target and/or a blade pitch change curve that controls the pitch of the blades as they are adjusted toward the blade pitch control target. The wind turbine operating command 136 may also facilitate setting a generator torque control target and/or a generator torque change curve that controls the generator torque as it is adjusted toward the generator torque control target.

In an exemplary embodiment, control algorithm parameter 130 is a gain or a set of gains, for example, a proportional gain and/or an integration gain, that is applied in the control algorithm. Furthermore, control algorithm parameter 130 may include a controller matrix/model for use by a control system using state-space control techniques and/or a multi-input/multi-output control system. In some examples, the control algorithm is stored in memory 66 (shown in FIG. 3) of system controller 44. System controller 44 uses the control algorithm to generate operating commands for adjustable components of wind turbine 10. In the exemplary embodiment, the operating commands are dependent upon inputs to the control algorithm, for example, control algorithm parameter 130, wind turbine set point 132, and sensor readings 134. More specifically, in the exemplary embodiment, the control algorithm outputs operating commands to, for example, variable blade pitch system 42 and/or frequency converter 34. In the exemplary embodiment, the operating commands may include a response bandwidth signal and a response speed signal. The response bandwidth signal and the response speed signal control the speed at which the adjustable component reaches a target position. The response bandwidth signal is sent from system controller 44 to, for example, upwind wind condition measurement device 60, and configured to control a frequency at which device 60 measures upwind wind conditions (e.g., control a resolution of device 60, and therefore, the ability of device 60 to differentiate between wind conditions). The response speed signals is sent from system controller 44 to, for example, variable blade pitch system 42 and/or frequency converter 34, and configured to control a speed at which system 42 and converter 34 respond to signals from system controller 44. The response bandwidth and response speed are inversely proportional to a response time. In other words, the response bandwidth and response speed determine a length of time for the adjustable component to move from a present position to the target position.

The operating commands also include an error range signal, for example, a blade pitch error range signal and a generator torque error range signal. The error range signal controls the accuracy of adjustments to wind turbine components. For example, the blade pitch error range is a range surrounding a blade pitch control target and the generator torque error range is a range surrounding a generator torque control target. Greater accuracy (i.e., smaller error ranges) facilitate higher performance of wind turbine 10 because wind turbine components are positioned closer to a desired position. However, smaller error ranges may also decrease wind turbine stability due to increases in wind turbine component oscillations back-and-forth with overshoots across, and out of, the error range bounds around the control target until settling at a position within the error range.

Figure 6:
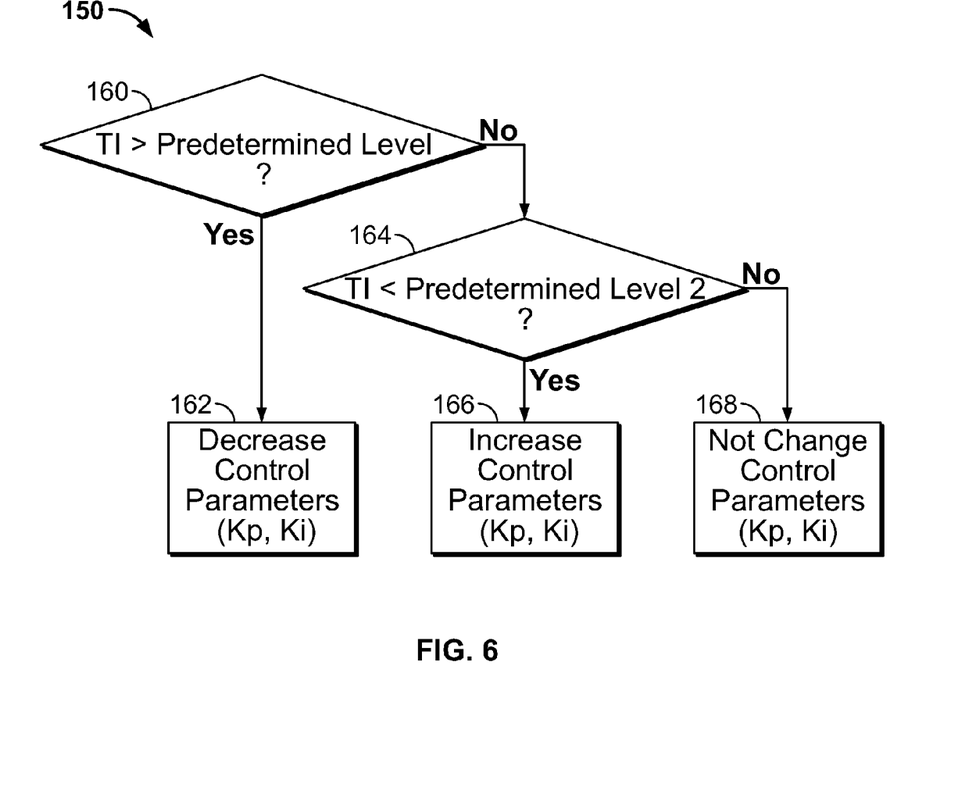
FIG. 6 is a decision tree illustrating an exemplary process executed by a wind turbine controller.

FIG. 6 is a decision tree 150 illustrating an exemplary process executed by a wind turbine controller, for example, system controller 44 (shown in FIG. 3). In the exemplary embodiment, control algorithm parameters that correspond to rated operation of wind turbine 10 are stored, for example, in memory 66 (shown in FIG. 3). In the exemplary embodiment, system controller 44 is programmed to use the rated control algorithm parameters when wind speed and wind turbulence intensity are within stored ranges. In the exemplary embodiment, system controller 44 is programmed to compare 160 upwind wind turbulence intensity 124 (shown in FIG. 5) to a first stored wind turbulence intensity level. If the measured upwind wind turbulence intensity 124 is greater than the first stored wind turbulence intensity level, system controller 44 is configured to decrease 162 the rated control algorithm parameters. For example, system controller 44 may be configured to decrease the control algorithm gain. If the measured upwind wind turbulence intensity 124 is less than the first stored wind turbulence intensity level, system controller 44 is configured to compare 164 the measured upwind wind turbulence intensity 124 to a second stored wind turbulence intensity level, wherein the second wind turbulence intensity level is lower than the first wind turbulence intensity level. If the measured upwind wind turbulence intensity is less than the second stored wind turbulence intensity level, system controller 44 is configured to increase 166 the rated control algorithm parameters. For example, system controller 44 may be configured to increase the control algorithm gain. If the measured upwind wind turbulence intensity 124 is between the first stored wind turbulence intensity level and the second stored wind turbulence intensity level, system controller 44 is configured to not change 168 the control algorithm parameters.

Figure 7:
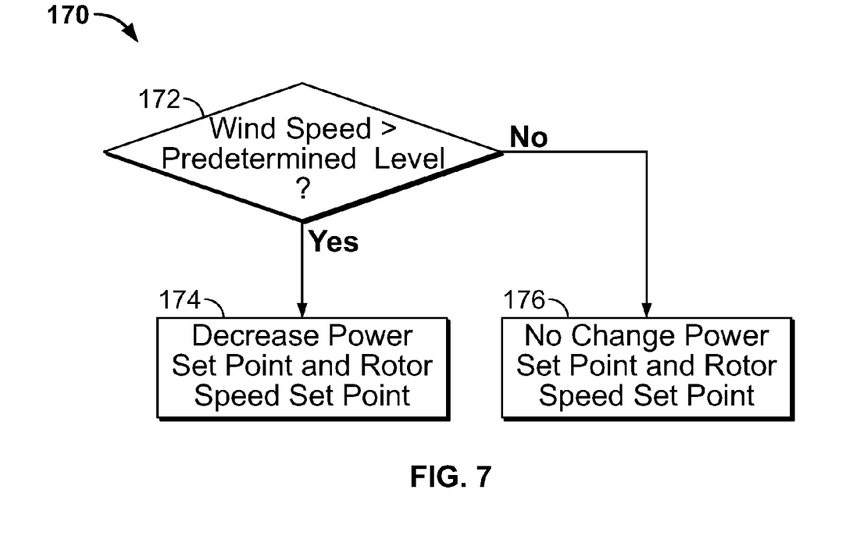
FIG. 7 is a decision tree illustrating an exemplary process executed by a wind turbine controller.

FIG. 7 is a decision tree 170 illustrating an exemplary process executed by a wind turbine controller, for example, system controller 44 (shown in FIG. 3). In the exemplary embodiment, a rated power set point and a rotor speed set point that correspond to rated operation of wind turbine 10 are stored, for example, in memory 66 (shown in FIG. 3). In the exemplary embodiment, system controller 44 is programmed to compare 172 a measured upwind wind speed 120 and a stored wind speed that corresponds to rated operation of wind turbine 10. In the exemplary embodiment, if the measured wind speed 120 is greater than the stored wind speed, system controller 44 is configured to decrease 174 at least one of the stored power set point and the stored rotor speed set point. If the measured wind speed 120 is less than the stored wind speed, system controller 44 is configured to not change 176 the stored power set point or the stored rotor speed set point.

Figure 8:
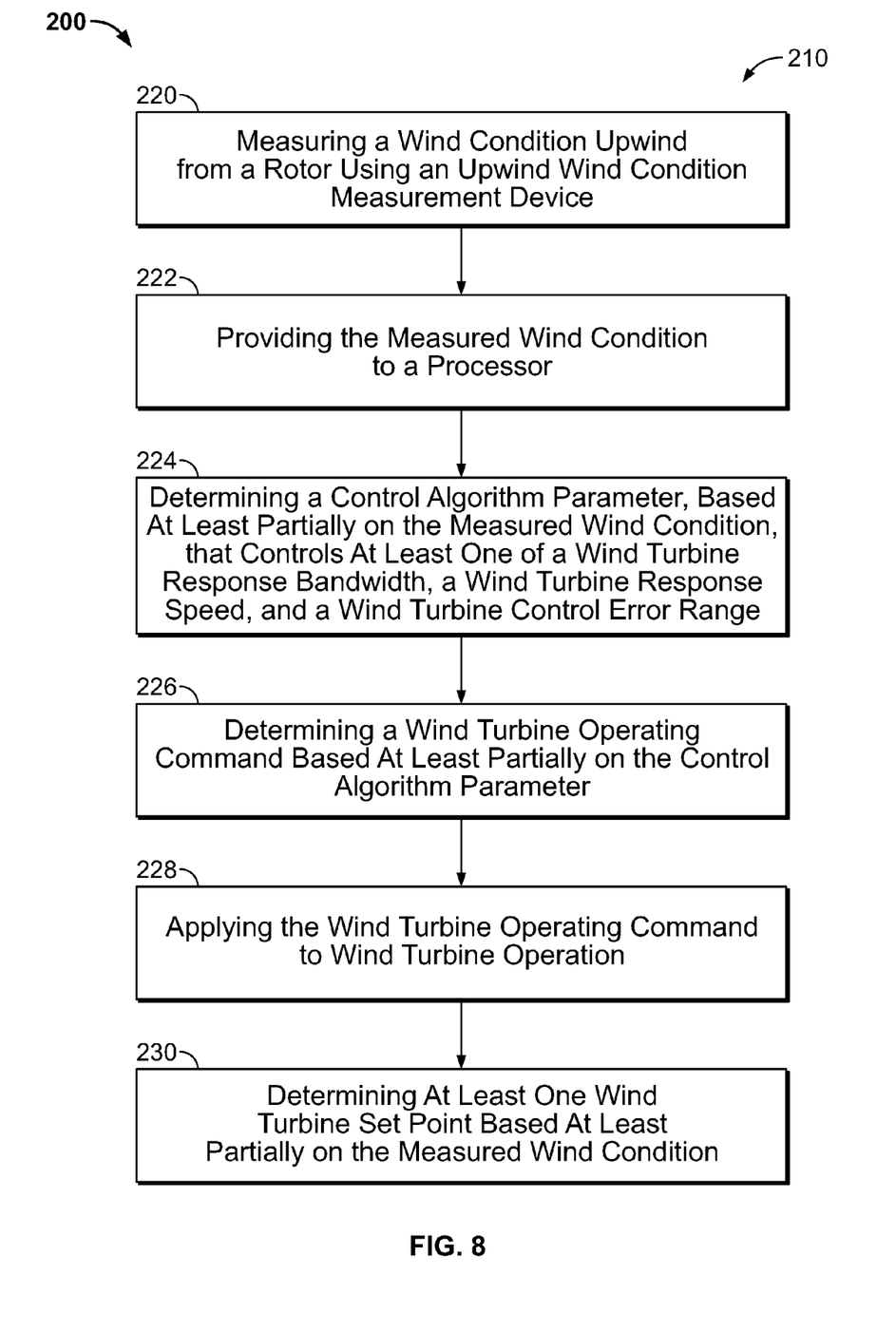
FIG. 8 is a flow chart of an exemplary method for controlling a wind turbine.

FIG. 8 is a flow chart 200 of an exemplary method 210 for controlling a wind turbine, for example, wind turbine 10 (shown in FIGS. 1-4). In an exemplary embodiment, method 210 is a computer-implemented method, for example, a computer-implemented method executed by processor 64 (shown in FIG. 3). In another exemplary embodiment, a computer program embodied on a computer-readable medium includes at least one code segment, that when executed by, for example, processor 64, performs method 210.

As described above, wind turbine 10 includes a rotor having a plurality of rotor blades, for example, rotor 14 having rotor blades 24 (shown in FIG. 1), and an upwind wind condition measurement device, for example, upwind wind condition measurement device 60 (shown in FIGS. 3-4). In the exemplary embodiment, method 210 includes measuring 220 a wind condition upwind from rotor 14 using upwind wind condition measurement device 60. Upwind wind condition measurement device 60 measures 220 at least one of a wind speed of wind upwind from rotor 14, a wind direction of wind upwind from rotor 14, and a wind turbulence intensity of wind upwind from rotor 14. Method 210 also includes providing 222 the measured wind condition to a processor, for example, processor 64.

In the exemplary embodiment, method 210 also includes determining 224 a control algorithm parameter, based at least partially on the measured wind condition, that controls at least one of a response bandwidth, a response speed, a control error range of a system and/or a component of wind turbine 10. For example, processor 64 may be configured to determine 224 the control algorithm parameter. More specifically, processor 64 may be configured to determine 224 a control algorithm gain, for example, a proportional gain and/or an integration gain, that control a response bandwidth, a response speed and/or a control error range, dependent upon upwind wind turbulence intensity.

The wind turbine response bandwidth and response speed control a speed at which components of wind turbine 10 reach a control target setting. In one example, the quickest that variable blade pitch system 42 (shown in FIG. 2) is able to change a pitch of blades 24 by ten degrees may be ten seconds. However, in the exemplary embodiment, variable blade pitch system 42 is able to change the pitch of blades 24 more slowly. Increasing the response bandwidth and/or response speed facilitates achieving desired positions of wind turbine components more quickly. Having wind turbine components in desired positions more quickly, and therefore a higher percentage of the time, facilitates increased wind turbine performance (i.e., higher efficiency and more stable output power). However, increasing the response bandwidth/speed also decreases stability of the wind turbine components. For example, increasing the component response speed may increase wind turbine component oscillation during periods of time with high wind turbulence intensity. Slowing the component response bandwidth/speed during periods of time with high wind turbulence intensity may reduce wind turbine performance, but it increases wind turbine stability by reducing rapid and frequent adjustments to wind turbine components.

Examples of wind turbine control error ranges include a blade pitch error range and a generator torque error range. The blade pitch error range is a range surrounding a blade pitch control target. In a specific example, the blade pitch control target is positioning the blade at twenty-four degrees. The blade pitch error range may be four degrees (e.g., twenty-four degrees plus or minus four degrees). The generator torque error range is a range surrounding a generator torque control target. In a specific example, the generator torque control target is approximately five million newton meters (Nm). The generator torque error range may be two percent (e.g., five million Nm plus or minus two percent). Increasing control error ranges facilitates decreasing oscillation of wind turbine components within a range surrounding the control target until achieving a position within the error range A control algorithm gain may be stored, for example, in memory 66 (shown in FIG. 3). The stored control algorithm gain may correspond to rated operation of wind turbine 10. In the exemplary embodiment, determining 224 the control algorithm gain includes reducing the stored control algorithm gain when the measured wind turbulence intensity is greater than a first stored wind turbulence intensity, increasing the stored control algorithm gain when the measured wind turbulence intensity is less than a second stored wind turbulence intensity, and maintaining the stored control algorithm gain when the measured wind turbulence intensity is less than the first stored wind turbulence intensity and greater than the second stored wind turbulence intensity. Reducing the control algorithm gain increases at least one of a wind turbine component response time to the wind turbine operating command and the blade pitch error range and the generator torque error range. Increasing the wind turbine operating response time and the blade pitch and generator torque error ranges facilitates reducing wind turbine component oscillation.

Increasing the control algorithm gain decreases at least one of the wind turbine component response time to the wind turbine operating command and the blade pitch error range and the generator torque error range. Decreasing the wind turbine component response time and the blade pitch and generator torque error ranges facilitates increasing wind turbine performance.

In the exemplary embodiment, method 210 also includes determining 226 a wind turbine operating command based at least partially on the control algorithm parameter and applying 228 the wind turbine operating command to wind turbine operation. For example, processor 64 may be configured to determine 226 a blade pitch command that facilitates setting a blade pitch within a blade pitch error range of a blade pitch control target. Processor 64 may also be configured to determine 226 a generator torque command that facilitates setting a generator torque within a generator torque error range of a generator torque control target.

In the exemplary embodiment, method 210 also includes determining 230 at least one wind turbine set point based at least partially on the measured wind condition. For example, processor 64 may be configured to determine 230 at least one of a power set point and a rotor speed set point based at least partially on a measured wind direction and/or a measured wind speed. The power set point and rotor speed set point may be reduced from stored rated values when the measured wind speed is greater than a stored maximum wind speed.

The above described methods and system for operating a wind turbine facilitate cost effective and highly reliable operation of the wind turbine. The methods and system described herein facilitate increasing power production by proactively adjusting wind turbine operation based on approaching wind conditions, while also balancing the torque applied to the wind turbine from the wind and the torque applied to the wind turbine by the generator. The methods and system described herein also facilitate balancing wind turbine performance with wind turbine stability. During periods of time having low wind turbulence intensity, higher wind turbine performance is achieved by increasing a control algorithm gain, which increases a wind turbine response bandwidth/speed and/or reduces a wind turbine control error range. During periods of time having high wind turbulence intensity, higher stability is achieved by decreasing the control algorithm gain, which decreases the wind turbine response bandwidth/speed and/or increases the wind turbine control error range. More specifically, the above described system and methods facilitate operating a wind turbine with higher performance when wind conditions, for example, a wind turbulence intensity, are conducive to less stable operation.

Exemplary embodiments of a wind turbine are described above in detail. The wind turbine and assemblies included within the wind turbine are not limited to the specific embodiments described herein, but rather each component may be utilized independently and separately from other components described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for controlling operation of a wind turbine, the wind turbine comprising a rotor having a plurality of rotor blades and an upwind wind condition measurement device, said method comprising:
measuring a wind condition upwind from the rotor using the upwind wind condition measurement device;
providing the measured wind condition to a processor;
determining a control algorithm parameter, based at least partially on the measured wind condition, that controls at least one of a wind turbine response bandwidth and a wind turbine control error range;
determining a wind turbine operating command based at least partially on the control algorithm parameter; and,
applying the wind turbine operating command to operation of the wind turbine.

2. A method in accordance with claim 1, wherein determining a wind turbine operating command comprises determining a generator torque command that facilitates setting at least one of a generator torque and a generator torque change curve within a generator torque error range of a generator torque control target.

3. A method in accordance with claim 1, wherein determining a control algorithm parameter comprises at least one of:
determining a control algorithm parameter that controls a bandwidth of at least one of a component and a system of the wind turbine;
determining a control algorithm parameter that controls a response speed of at least one of a component and a system of the wind turbine; and,
determining a control algorithm parameter that controls a control error range of at least one of a component and a system of the wind turbine.

4. A method in accordance with claim 3, further comprising at least one of:
determining a control algorithm parameter that controls a bandwidth of the upwind wind condition measurement device;
determining a control algorithm parameter that controls a response speed of at least one of a variable blade pitch system and a frequency converter; and,
determining a control algorithm parameter that controls a control error range for at least one of a variable blade pitch system and a frequency converter.

5. A method in accordance with claim 1, wherein determining a control algorithm parameter comprises determining at least one of a control algorithm gain, a set of control algorithm gains, and a controller matrix/model based at least partially on a measured wind turbulence intensity.

6. A method in accordance with claim 5, wherein determining a control algorithm gain comprises determining at least one of a proportional gain and an integration gain.

7. A method in accordance with claim 5, further comprising:
reducing a stored control algorithm gain when the measured wind turbulence intensity is greater than a first stored wind turbulence intensity;
increasing the stored control algorithm gain when the measured wind turbulence intensity is less than a second stored wind turbulence intensity; and,
maintaining the stored control algorithm gain when the measured wind turbulence intensity is less than the first stored wind turbulence intensity and greater than the second stored wind turbulence intensity.

8. A method in accordance with claim 7, wherein reducing the stored control algorithm gain further comprises at least one of:
decreasing a wind turbine response bandwidth to facilitate reducing oscillation;
increasing a wind turbine response time to the wind turbine operating command to facilitate reducing oscillation; and,
increasing the blade pitch error range and the generator torque error range to facilitate reducing oscillation.

9. A method in accordance with claim 8, wherein increasing the stored control algorithm gain further comprises at least one of:
increasing the wind turbine response bandwidth to facilitate increasing wind turbine performance;
decreasing the wind turbine response time to the wind turbine operating command to facilitate increasing wind turbine performance; and,
decreasing the blade pitch error range and the generator torque error range to facilitate increasing wind turbine performance.

10. A method in accordance with claim 1, further comprising determining at least one wind turbine set point based at least partially on the measured wind condition.

11. A method in accordance with claim 10, wherein determining the at least one wind turbine set point comprises determining at least one of a power set point and a rotor speed set point based at least partially on at least one of a measured wind direction and a measured wind speed.

12. A method in accordance with claim 11, further comprising:
reducing the at least one of a rated power set point and a rated rotor speed set point when the measured wind speed is greater than a stored maximum wind speed;
reducing the at least one of a rated power set point and a rated rotor speed set point when the measured turbulence intensity level is greater than a stored maximum turbulence intensity level; and,
reducing the at least one of a rated power set point and a rated rotor speed set point when the measured wind direction changes at higher than a stored rate.

13. A method for facilitating operation of a wind turbine, the wind turbine comprising a system controller and an upwind wind condition measurement device, said method comprising:
configuring the upwind wind condition measurement device to provide the system controller with at least one upstream wind condition measurement; and,
configuring the system controller to:
receive the at least one upstream wind condition measurement;
determine a control algorithm parameter, based at least partially on the upstream wind condition measurement, that controls at least one of a wind turbine response bandwidth and a wind turbine control error range;
determine a wind turbine operating command based at least partially on the control algorithm parameter; and,
apply the wind turbine operating command to operation of the wind turbine.

14. A method in accordance with claim 13, wherein configuring the upwind wind condition measurement device comprises configuring the upwind wind condition measurement device to provide the system controller with at least one of an upwind wind speed, an upwind wind direction, and an upwind wind turbulence intensity.

15. A method in accordance with claim 14, further comprising configuring the system controller to determine at least one of a power set point and a rotor speed set point based at least partially on the upwind wind speed.

16. A method in accordance with claim 13, further comprising configuring the system controller to change at least one of the wind turbine response speed and the wind turbine response bandwidth based on the at least one upwind wind condition measurement.

17. A method in accordance with claim 13, wherein configuring the system controller to determine a control algorithm parameter comprises configuring the system controller to determine at least one of a control algorithm gain, a set of control algorithm gains, and a controller model/matrix.

18. A method in accordance with claim 13, wherein configuring the system controller to determine a wind turbine operating command comprises at least one of:
   determining a blade pitch command that facilitates setting at least one of a blade pitch and a blade pitch change curve within an error range of a blade pitch control target; and,
   determining a generator torque command that facilitates setting at least one of a generator torque and a generator torque change curve within an error range of a generator torque control target.

19. A method in accordance with claim 18, further comprising configuring the system controller to change at least one of the blade pitch error range and the generator torque error range based on the at least one upwind wind condition measurement.

20. A wind turbine control system for a wind turbine that includes a frequency converter, said wind turbine control system comprising:
   an upwind wind condition measurement device positioned on or in close proximity to a body of the wind turbine, said upstream wind condition measurement device configured to measure at least one upwind wind condition; and,
   a processor coupled to said upwind wind condition measurement device, said processor configured to:
      receive the upwind wind condition measurement;
      determine a control algorithm parameter, based at least partially on the upwind wind condition measurement, that controls at least one of a wind turbine response bandwidth and a wind turbine control error range;
   determine a wind turbine operating command, based at least partially on the control algorithm parameter, that controls operation of the frequency converter; and,
   apply the wind turbine operating command to operation of the wind turbine.

* * * * *